INVENTOR
PAUL G. SALERNO
BY
ATTORNEY

United States Patent Office 3,489,165
Patented Jan. 13, 1970

3,489,165
INLINE PRESSURE REGULATOR
Paul G. Salerno, Glenview, Ill., assignor to Vapor Corporation, Chicago, Ill., a corporation of Delaware
Filed Oct. 30, 1968, Ser. No. 771,882
Int. Cl. F16k 1/12
U.S. Cl. 137—220                                6 Claims

ABSTRACT OF THE DISCLOSURE

Inline pressure regulator including a valve body having a coaxial cylinder receiving a piston connected to a poppet coacting with a valve seat at the inlet to control air flow through the valve and regulate the pressure at the outlet, wherein the piston is exposed on one side to the inlet pressure and on the other side to a regulated pressure that approximately adjusts the outlet pressure.

---

Figure 1:
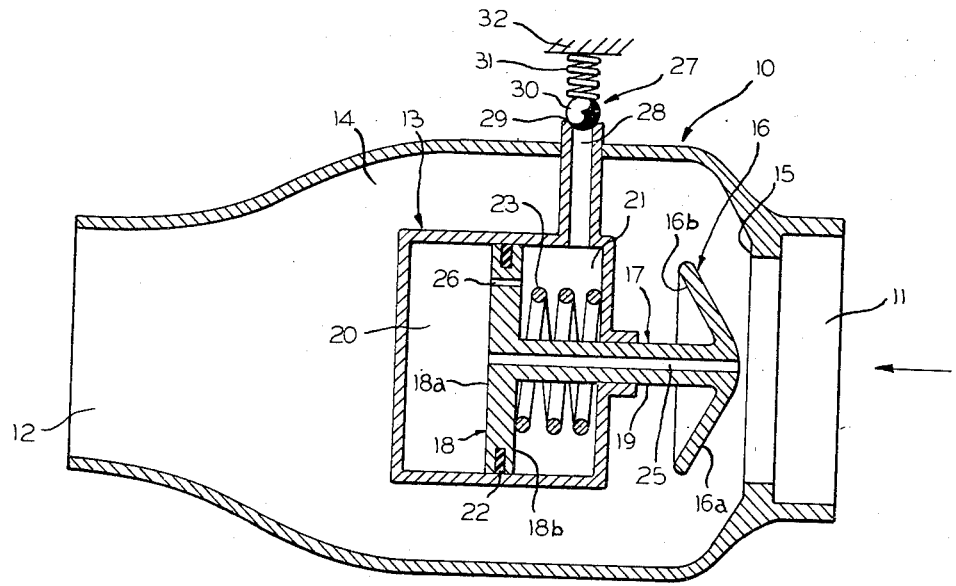

This invention relates in general to a pressure regulator for controlling air pressure in a line, and more particularly to an inline pressure regulator of light weight for regulating the pressure in the line.

The inline pressure regulator of the present invention is an improvement over heretofore developed pressure regulators in that it is light weight and of small size, with a relatively few number of parts that are simply constructed and assembled, thereby making the regulator very economical to manufacture, and especially suitable for use in aircraft. The regulator includes a valve body having an inlet and outlet axially aligned therewith. A cylinder is mounted within the body coaxially with the inlet and outlet and is provided with a piston. A poppet valve, including valve seat at the inlet coacting with a poppet that is connected to the piston by means of a shaft, controls air flow through the valve. A spring continually biases the poppet towards open position away from the valve seat. The piston in the cylinder forms a piston chamber on one side and a regulating chamber on the other side adjacent the poppet. The pressure in the piston chamber is maintained substantially equal to the inlet pressure by providing a passageway of sufficient size extending through the shaft. A small bleed hole is defined in the piston to permit the inlet pressure to bleed to the regulating chamber. A relief type valve is provided for the regulating chamber that may be adjustable if desired, and which serves to regulate the pressure in the regulating chamber and consequently the position of the poppet relative to the valve seat, and ultimately the pressure at the outlet of the valve.

Accordingly, it is an object of the present invention to provide a new and improved inline pressure regulator.

Another object of the present invention is in the provision of an inline pressure regulator that is light weight and small in size, simply constructed of a few number of parts, and economical to manufacture.

Figure 2:
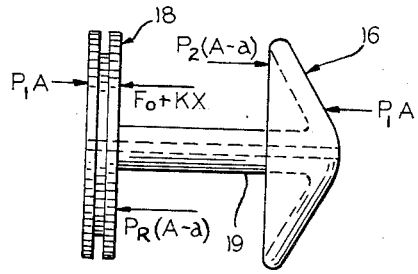

Other objects, features and advantages of the invention will be apparent from the following detailed disclosure, taken in conjunction with the accompanying sheet of drawing, wherein like reference numerals refer to like parts, in which:

FIG. 1 is a somewhat diagrammatic view showing an axial sectional view taken through a pressure regulator according to the present invention; and FIG. 2 is an elevational view of the poppet and piston assembly as a free body diagram to illustrate the forces effecting operation of the assembly.

Referring now to the drawing, the pressure regulator of the present invention includes a generally cylindrical valve body 10 having a necked down inlet 11 and a necked down outlet 12 axially aligned therewith. A cylinder 13 is suitably mounted within the valve body intermediate the inlet and outlet and coaxally therewith. The inlet and outlet ends of the valve body would be connected to a suitable line to provide inline air pressure control so that the regulator would have an air pressure at the inlet that would be regulated as to the outlet in any desired manner.

The cylinder 13 is cylindrical in form and defines with the valve body an annular passageway 14 through which the air flow passes between the inlet and outlet in the usual manner. A poppet valve including a valve seat 15 is provided at the inlet end to coact with a poppet 16 of a piston-poppet valve assembly 17 in regulating the air flow through the valve and pressure at the outlet. The poppet 16 of the assembly 17 is interconnected to a piston 18 by means of a shaft 19.

The piston 18 of the piston-poppet valve assembly 17 is slidably received in the cylinder 13 and defines on one side a piston chamber 20 and on the other side a regulating chamber 21. The regulating chamber 21 is closely adjacent to the poppet valve 16, and is on the side of the piston facing the inlet 11 while the piston chamber is on the side of the piston facing the outlet 12. The piston 18 carries a sealing ring 22 in a peripheral groove for effecting sealing relationship with the cylinder 13.

A spring 23 is received within the cylinder and bottomed at one end against the valve side of the piston 18 and at the other end against the adjacent end of the cylinder to continually urge the piston-poppet assembly in a direction away from the inlet 11, thereby urging the poppet 16 to open position. A large passageway 25 extends through the shaft 19 to intercommunicate the piston chamber 20 with the inlet 11 and continually provide the inlet pressure to the piston chamber. Shaft 19 extends through a bore in the shaft side of the cylinder and is in sealing engagement with the bore. The size of the passageway is such as to insure the piston chamber pressure to always be equal to the inlet pressure. A bleed hole or orifice 26 is provided in the piston 18 to allow the pressure in the piston chamber 20 to slowly bleed to the regulating chamber 21 during operation of the valve.

Figure 3:
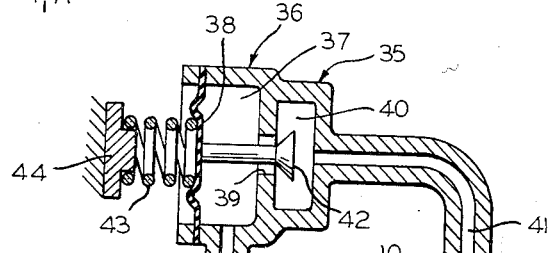
Figure 3:
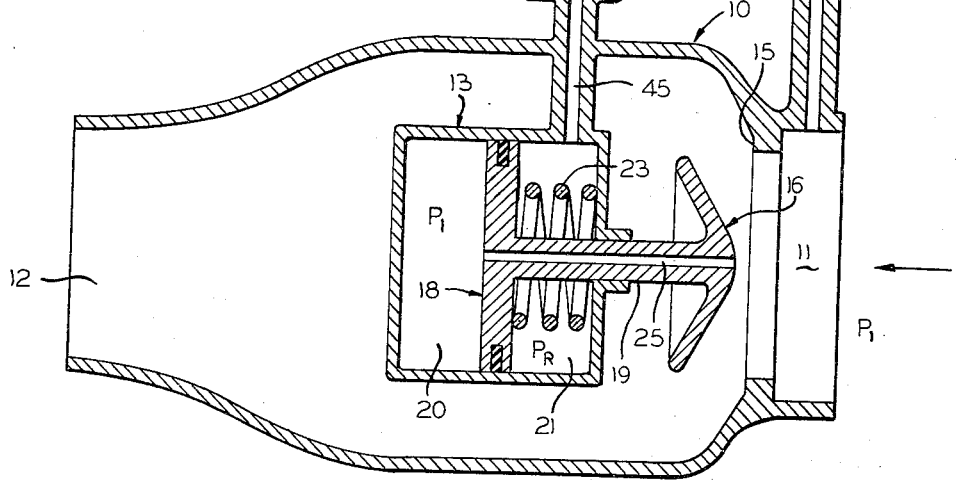

In order to regulate the pressure in the regulating chamber 21 and ultimately the pressure at the outlet 12, a relief type valve or regulator 27 is provided for the regulating chamber 21 at the end of a passageway 28 leading between the regulating chamber and the atmosphere outside the valve body. It will be recognized that a diaphragm regulator may be used in place of the relief type regulator, and such will be further described as shown in FIG. 3. This relief type valve may take any desired form, and for the purposes of the illustrated embodiment includes a valve seat 29 coacting with a ball 30 that is continually urged to seated position by a spring 31. While the tension on the spring is shown as fixed, since it is bottomed at one end against a fixed support 32, it will be apreciated that it could be made adjustable by any suitable device to vary the relief pressure.

The area of the poppet 16 on the face 16a is and must be equal to the area of the piston on the face 18a, so that the forces against these faces balance and cancel one another. Further, the opening at the seat 15 is such that its area equals the area of the piston 18 on face 18a.

In operation of the valve, the air pressure at the inlet 11, equalizing the air pressure in the piston chamber 20, defines equal forces in opposite directions against the poppet face 16a on the inlet side thereof and the piston valve face 18a. This force may be defined as $P_1A$, as is shown in FIG. 2, where $P_1$ equals the pressure at the inlet and A equals the area of the poppet on the face 16a, or the area on the piston face 18a since it is equal to the poppet area. The symbol "a" represents the area of the shaft 19. While $P_1$ represents the inlet pressure at the inlet 11, $P_2$ represents the outlet pressure at the outlet 12. Force $P_2(A-a)$ is applied against the face 16b on the outlet side of the poppet in opposition to the force $P_1A$ against the poppet and supplementing the force $P_1A$ against the piston. The regulating pressure force in the chamber 21 may be defined as $P_R(A-a)$, and is applied against the face 18b of the piston. Additionally, the force $F_o$ plus the force $KX$ is applied against the piston face 18b, where $F_o$ equals the initial spring force of the spring 23, K equals the spring rate of spring 23, and X equals the poppet valve displacement. $P_R$ also defines the pressure at the relief type valve 27. Accordingly, it can be recognized in the force balance relationship that the $P_1$ forces cancel out, and $P_2$ essentially equals $P_R$, especially when the forces $F_o$ and K are small. The following equation represents the force balance relationship:

$$P_1A + P_2(A-a) = P_R(A-a) + P_1A + F_o + KX$$

$$P_2 = P_R + \frac{F_o + KX}{A-a}$$

Thus, it is seen that $P_R$ is controlled by the relief type valve 27 which thereby controls $P_2$. The pressure maintained in the regulating chamber 21 will be substantially equal to the pressure at the outlet. If the valve 27 is adjustable, the outlet pressure can be varied from full inlet pressure to any pressure therebelow. Thus, when the pressure in the regulating chamber reaches that which the relief valve 27 is set, the relief valve will thereafter open to maintain the regulating chamber pressure at the set pressure of the relief valve and maintain the outlet pressure constant.

The embodiment of FIG. 3 differs from the embodiment of FIG. 1 only in that a diaphragm regulator 35 is employed in place of the relief type regulator 27 for regulating the pressure at the outlet 12. In this embodiment, it should be noted that no bleed hole is provided in the piston 18 between the piston chamber 20 and the regulating chamber 21.

Diaphragm regulator 35 includes a body 36 having a diaphragm chamber 27 closed at one end by a diaphragm 38. A port 39 opposes the diaphragm and leads to a supply chamber 40, that is in turn connected to the inlet 11 by a passage 41. The air flow through the port is controlled by a valve 42 connected to and movable with the diaphragm 38. A spring 43 bottoms at one end against a fixed support 44 and at the other end against the diaphragm 38 to counter the pressure in the diaphragm chamber and maintain a set pressure within the diaphragm chamber. The set pressure is vented to the regulating chamber 21 of the cylinder 13 through a passage 45, thereby regulating the position of the poppet 16 and the outlet pressure. The force balance equation applies here in the same manner as in the embodiment of FIG. 1. As explained, $P_R$ is obtained by the diaphragm regulator.

The invention is hereby claimed as follows:

1. An inline pressure regulator comprising a valve body having an inlet and an outlet axially aligned with the inlet, a cylinder coaxially mounted within said body between the inlet and outlet and defining with the body an annular passageway providing continual communication between the inlet and outlet, a piston in said cylinder, a valve seat at the inlet, a poppet mounted on said piston by a shaft extending therebetween and coacting with the valve seat, the area of the poppet face being equal to the area of the piston face, a passageway between the piston and poppet of such size as to cause the piston pressure to be equal to that at the inlet, spring means normally biasing the poppet toward open position away from the valve seat, a regulator intercommunicating with the poppet side of the piston to regulate the pressure thereagainst and the pressure at the outlet, and a bleed orifice in said piston intercommunicating both sides of the piston.

2. An inline pressure regulator as defined in claim 1, wherein said passageway between the poppet and piston extends through said shaft.

3. An inline pressure regulator as defined in claim 1, wherein the regulator defines the force balance equation $$P_2 = P_R + \frac{F_o + KX}{A-a}$$

where $P_2$ equals the outlet pressure, $P_R$ equals the pressure in the cylinder on the poppet side of the piston, $F_o$ equals the initial spring force of the spring means, K equals the spring rate of the spring means, and X equals the cylinder displacement, and $a$ equals the shaft area.

4. An inline pressure regulator comprising a valve body having an inlet and an outlet axially aligned with the inlet, a cylinder coaxially mounted within said body between the inlet and outlet and defining with the body an annular passageway providing continual communication between the inlet and outlet, a piston in said cylinder defining a piston chamber on the side facing the outlet and a regulating chamber on the side facing the inlet, a valve seat at the inlet, a poppet valve mounted on said piston by a shaft extending therebetween and coacting with the valve seat, the area of the poppet valve face facing the inlet being equal to the area of the piston face facing the outlet, a passageway between the piston and poppet of such size as to cause the piston pressure to be equal to that at the inlet, a spring in said cylinder bottomed on one end against the regulating chamber side of the piston and at the other end against the end the cylinder adjacent the inlet to normally bias the poppet toward open position, and a regulator means communicating with the regulating chamber and maintaining a set pressure therein to regulate the position of the poppet valve and maintain a set pressure at the outlet.

5. An inline pressure regulator as defined in claim 4, wherein said regulator means includes a relief type regulator having a relief valve arranged between the regulating chamber and atmosphere, and a bleed orifice in said piston between said piston and regulating chambers.

6. An inline pressure regulator as defined in claim 4, wherein said regulator means includes a diaphragm regulator having a diaphragm operated valve arranged between the inlet and the regulating chamber for regulating the pressure in the regulating chamber.

References Cited

UNITED STATES PATENTS 3,173,441    3/1965    Elbogen _____ 137—220
3,362,424    1/1968    Smith _____ 137—220

HAROLD W. WEAKLEY, Primary Examiner

U.S. Cl. X.R.

137—489.5